R. D. WILSON.
Improvement in Fifth Wheels.
No. 122,425. Patented Jan. 2, 1872.
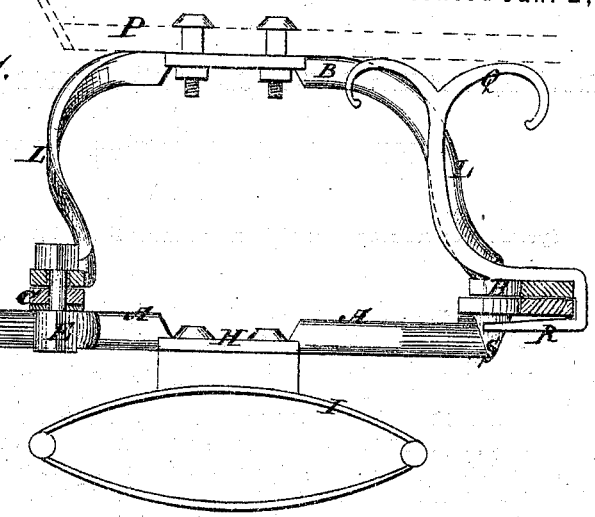
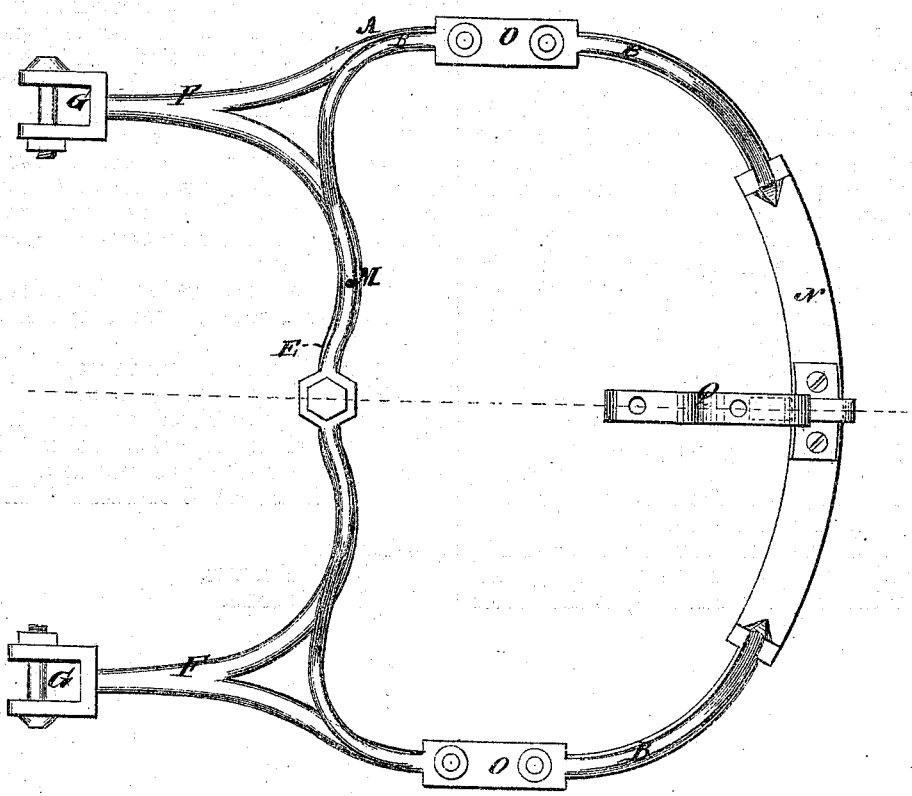

UNITED STATES PATENT OFFICE.

ROBERT DENHAM WILSON, OF PITTSTON, PENNSYLVANIA.

IMPROVEMENT IN FIFTH-WHEELS.

Specification forming part of Letters Patent No. 122,425, dated January 2, 1872.

Specification describing an Improved Front Gear for Carriages, invented by ROBERT DENHAM WILSON, of Pittston, in the county of Luzerne and State of Pennsylvania.

My invention consists of a front gear or platform for carriages, composed of two D-shaped bars of wrought-iron, arranged in peculiar shape, calculated to greatly cheapen the cost of such gear, and provide sufficient strength with less weight than any heretofore made.

Figure 1 is a longitudinal sectional elevation of my improved front gear, and Fig. 2 is a plan view.

I make two D-shaped bars, A and B, of light wrought-iron for my improved front gear, which I adapt to the requirements of a light cheap frame for connecting the carriage-body to the springs, and having the connection such that the wheels may turn horizontally, as required, by connecting the king-bolt $c$ to the part E, answering to the vertical part of the D at the center, providing an extension, F, at each corner, with a socket, G, in the end for the connection of the shafts, making the flat parts H at the top and bottom of the D for connection to the springs I, and making the flattened curved part K at the center of the bow of the D to serve the purposes of the sway-bar of the ordinary front gear, and by bending the ends of the bar B, corresponding to the top and bottom of the D, upward, as shown at L, Fig. 1, to the height the box is required to be above the bar A; providing a hole at the center of the bar M corresponding to the vertical part of the D for the king-bolt, making a flat curved portion, N, at the center of the bow of the D to work on the counterpart K of bar A, and providing the flat parts O at the highest part of the ends for the attachment of the carriage bottom, as indicated by the dotted lines P.

In addition to the above, I sometimes attach a brace, Q, to the center of the part N, extending up to the bottom of the body to be connected to it for strengthening the connection of the body with the bar B. I also sometimes attach a guide piece, R, to the center of part N, arranged to work under the corresponding part K of bar A, to prevent bar B from rising off bar A; also to strike against the shoulders S at the ends of part K and under it, to limit the amount the wheels may be turned; but I may use either of these devices or not.

This gear being all formed of two bars of metal, is very simple and cheap to make, and may be made up of pieces of scrap-iron of different shapes adapted to form the several parts welded together.

Having thus described my invention, I claim as new, and desire to secure by Letters Patent—

1. A front gear for carriages, consisting of the D-shaped iron bars A and B, constructed and arranged substantially as specified.

2. The combination with the bar B of the brace Q, substantially as specified.

ROBERT DENHAM WILSON.

Witnesses:
W. J. ECCLES,
I. B. EAGLE. (31)